United States Patent Office 3,513,219
Patented May 19, 1970

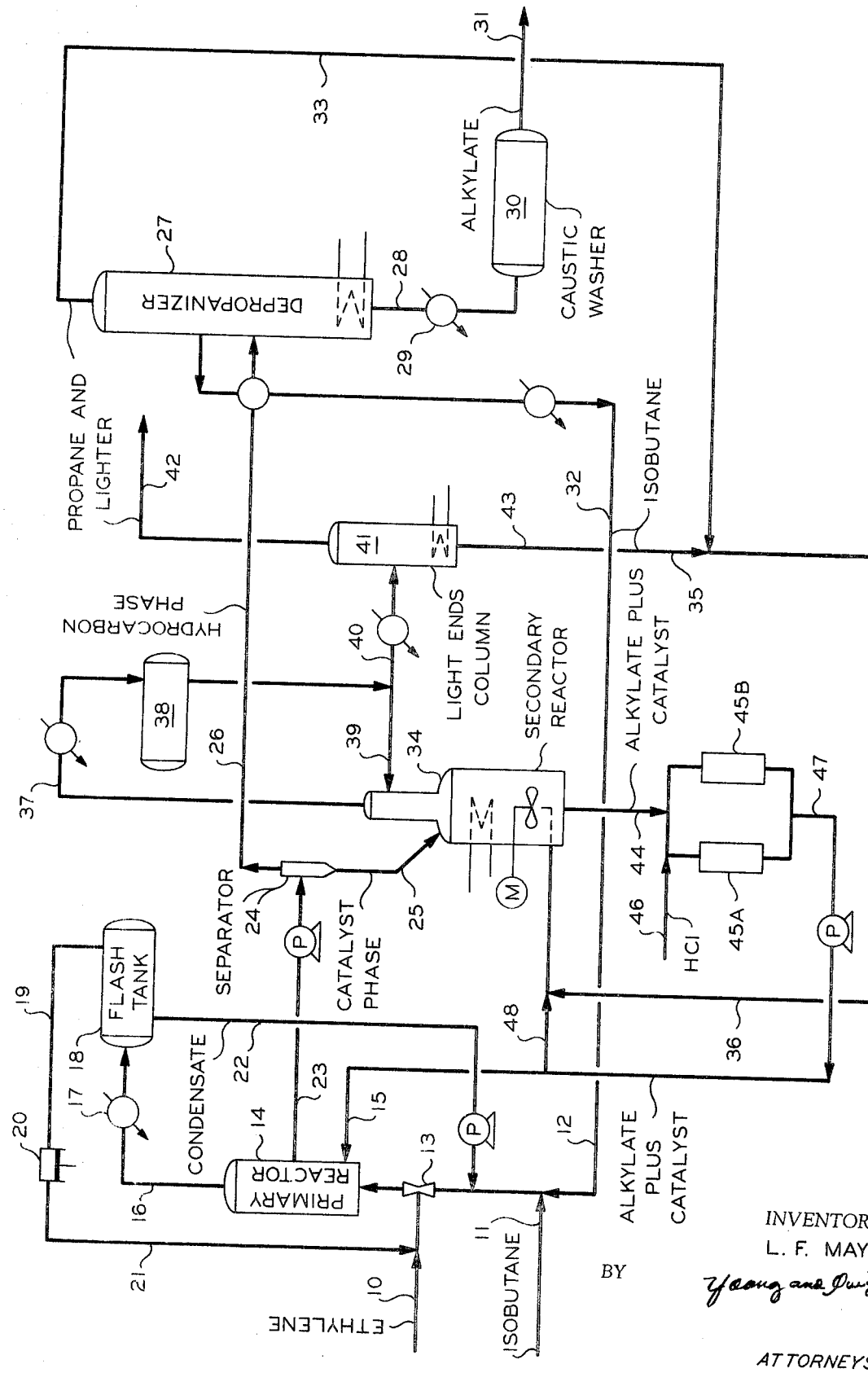

3,513,219
ALKYLATION PROCESS WITH RECYCLE OF ALKYLATE TO SEPARATE REACTION ZONES
Luther F. Mayhue, Bartlesville, Okla., assignor to Phillips Petroleum Company, a corporation of Delaware
Filed Oct. 24, 1967, Ser. No. 677,654
Int. Cl. C07c 3/56
U.S. Cl. 260—683.53                                    6 Claims

ABSTRACT OF THE DISCLOSURE

Alkylation process comprising a primary reactor and secondary reactor with separation and fractionation of hydrocarbon phase from the effluent of the primary reactor and recycle of alkylate from the secondary reactor along with hydrogen halide through aluminum granule chambers to the primary reactor, which alkylate is subsequently recovered along with the effluent from the primary reactor.

BACKGROUND OF THE INVENTION

This invention relates to the production of branched chain hydrocarbons by alkylation reactions. In another aspect, it relates to the production of branched chain hydrocarbons by the reaction of an olefin with an isoparaffin with provision for removal of impurities which tend to build up in the system. In a more specific aspect, the invention relates to the removal of ethane from an alkylation system wherein isobutane is reacted with ethylene containing ethane as an impurity.

The alkylation of isoparaffins with olefins to form branched chain hydrocarbons is well known. The branched chain hydrocarbons find utility in improving the quality of motor fuels, and thus have a considerably higher value than the lower molecular weight isoparaffins and olefins from which they are formed by alkylation processes.

Diisopropyl or 2,3-dimethylbutane is becoming increasingly important as a motor fuel due to the fact that it has an unleaded octane number greater than 100. Many processes have been devised for the production of diisopropyl with the use of aluminum chloride catalysts. This catalyst is very expensive and is usually employed as a complex with hydrocarbon.

Unreacted paraffins, as well as other olefins, and any paraffins introduced and produced in the alkylation operation must be removed from the process or they will continue to build up, e.g., in the recycle streams, and require a backing out of charge materials, since any system is limited to the amount of materials that can be present therein. Also, ethylene does not usually completely react in most alkylation operations, and the unreacted ethylene will normally be removed and lost from the system along with certain inerts, such as ethane. Normally, the heavier olefin, e.g., propylene, will substantially completely react in an alkylation process.

The major problem faced in using refinery process streams for alkylation purposes, therefore, arises when one of the streams contains as an impurity a hydrocarbon which will not enter the alkylation reaction, but which passes unreacted through the alkylation chamber and separation process. Since commercial alkylation processes invariably utilize a feedback or recycle of unreacted isoparaffin and olefin passing through the reactor, this unreacted impurity will remain in the alkylation system indefinitely, and will gradually build up to an undesirably high concentration. This problem is most often encountered with ethane, which is present in an ethylene-containing fraction.

Accordingly, an object of this invention is to provide an improved process for the production of higher grade motor fuel.

Another object of this invention is to provide a process for the production of 2,3-dimethylbutane from isobutane and ethylene.

It is still a further object of this invention to provide a method for alkylation wherein unreacted olefin and isoparaffin are reacted and recycled to the alkylation reaction and wherein impurities are removed from the alkylation system to prevent a buildup of impurities in that system.

Other aspects, objects, and the several advantages of this invention are apparent to one skilled in the art from a study of this disclosure, the drawing, and the appended claims.

SUMMARY OF THE INVENTION

The process of the invention comprises contacting an isoparaffin with an olefin under alkylation conditions, fractionating the hydrocarbon phase separated from the reaction product, and contacting the catalyst phase separated from the reaction product with additional isoparaffin and olefin under alkylation conditions, and contacting the reaction product removed from the latter contacting with hydrogen halide and aluminum to form an aluminum halide catalyst and returning the reaction product along with newly formed aluminum halide catalyst to the alkylation contacting.

More specifically, according to the invention, isoparaffin, such as isobutane, is alkylated with ethylene in a primary reactor in the presence of an aluminum halide catalyst. The reaction product removed from the alkylation reactor is separated into a hydrocarbon phase and a catalyst phase. The hydrocarbon phase is subjected to fractionation to recover a $C_3$ and lighter (including unreacted ethylene) overhead stream, an intermediate isobutane stream, and a bottoms alkylate stream.

The catalyst phase recovered from the effluent from the first alkylation reactor is passed to a secondary alkylation reactor wherein the catalyst phase is contacted with olefin, e.g., ethylene, and isoparaffin, e.g., isobutane. The source of ethylene for contacting in the secondary alkylation reactor is recovered overhead from the fractionation of the hydrocarbon phase separated from the primary reactor. Catalyst which is partially spent and hydrocarbon product removed from the secondary reactor are passed along with hydrogen halide, e.g., HCl, through aluminum granule chambers to form aluminum halide, e.g., aluminum chloride catalyst. The alkylate product produced in the secondary reactor serves as a carrier for passing the newly formed aluminum halide catalyst to either the primary reactor or to the secondary reactor, or both.

By the process of the invention, light impurities which are introduced to the system with the feed streams are continually removed from the system, thus preventing buildup of the impurities in the system. Furthermore, the process of the invention allows separation of the light impurities from the system without removing desirable isoparaffins and olefins along with the impurities. In a preferred embodiment, the invention is applicable to the reaction of isobutane with ethylene containing a small amount of ethane as an impurity.

DESCRIPTION OF PREFERRED EMBODIMENTS

This invention is particularly applicable to alkylation reactions being conducted in the presence of an aluminum halide existing as a hydrocarbon complex, e.g., aluminum chloride-hydrocarbon complex. Hydrogen halide, e.g., HCl, is an active promoter of catalyst activity and can be produced by injecting a controlled amount of water into the reaction. Other catalysts, also known in the art, can be used, including HF-BF$_3$. Another catalyst is a molten mixture of an antimony halide and an aluminum halide. A molten mixture of AlCl$_3$ and SbCl$_3$, containing from about 3 to 24 mol percent of aluminum chloride and modified, if desired, by the presence of a halide of an alkali or an alkaline earth metal, is highly suitable. It is to be understood, however, that the invention is in no wise limited to but one specific catalyst of the molten salt type, and other catalyst melts may be employed such as, for example, any of the following molten mixtures: aluminum chloride-sodium chloride-potassium chloride; aluminum chloride-sodium chloride-zinc chloride; aluminum chloride-sulfur dioxide-zinc chloride; aluminum chloride-sodium chloride-potassium chloride-zinc chloride; etc. A part or all of the halide components of the catalysts may comprise halides other than the chlorides, for example, the bromides.

Although it is most common to use a branch chain saturated compound for alkylation reactions, the normal hydrocarbons are also useful. In fact, any saturated hydrocarbon capable of being isomerized to a branched or more highly branched chain saturated hydrocarbon may constitute the saturated hydrocarbon charge to the system. It need not necessarily be a pure hydrocarbon and may have admixed therewith one or more other saturated hydrocarbons which may or may not be isomerized under the conditions of execution of the reaction. Particularly desirable saturated hydrocarbon starting materials comprise fractions such as the butane, pentane, hexane, etc., fractions and isomers thereof obtained by fractional distillation of natural or straight run gasoline or saturated hydrocarbon mixtures from any other sources. A saturated hydrocarbon mixture of considerably wider boiling range, which may comprise a substantial portion or all of the hydrocarbons boiling with the gasoline range, such as a natural gasoline, casinghead gasoline or the like, may constitute the saturated hydrocarbon charge to the system. In passing through the isomerization stage of the process substantial proportions of branched chain hydrocarbons are produced. The resulting isomerizate may be passed in part or in its entirety to the alkylation zone. It may be desirable to pass only a lower boiling fraction of the isomerizate to the alkylation zone in admixture with olefinic hydrocarbons and combine the resulting alkylate with the remaining higher boiling portion of the isomerizate.

An advantage of the invention resides in the economical and efficient utilization of ethylene or ethylene-containing fractions in the production of a branched chain hydrocarbon product. The invention is, however, not limited to the use of ethylene or ethylene-containing fractions as the olefinic charge to the process. Propylene, for example, may be used. The olefin may be charged to the alkylation zone in admixture with paraffinic hydrocarbons, thus enabling the use of ethane-ethylene, propane-propylene, ethane-ethylene-propane-propylene fractions without the need for a preliminary separation of the olefin from the paraffin.

The operation of the process of the invention can be seen by reference to the attached drawing. Ethylene, which can contain ethane impurity, is charged to the system by conduit 10, fresh isobutane reaction, which can contain inert propane and normal butane, is charged by conduit 11, and recycle isobutane is charged by way of line 12. Fresh isobutane, recycle isobutane, and ethylene are mixed in eductor 13 and introduced into primary reactor 14. Catalyst, specifically aluminum chloride-hydrocarbon complex catalyst, is introduced into reactor 14 by way of line 15, to be more specifically described hereinafter. Light materials are taken overhead from primary reactor 14 by way of line 16, cooled by heat exchanger 17, and introduced into flash tank 18. The noncondensible materials are removed from tank 18 by way of line 19, compressed in compressor 20, and returned to the reactor by way of line 21. Condensed materials are removed from tank 18 by way of line 22 and returned to the reactor along with the feed materials.

The reactor effluent comprising unreacted charged materials, catalyst complex, and produced alkylate (DIP) is passed by way of line 23 to separator 24, wherefrom the separated catalyst phase is removed by line 25 and the separated hydrocarbon phase by line 26. The separated hydrocarbon phase is passed to depropanizer 27. In depropanizer 27, the alkylate which has been formed is removed by conduit 28, cooled by heat exchanger 29, caustic washed to remove entrained and/or dissolved catalyst in tank 30, and removed as alkylate product through line 31. An intermediate fraction comprising isobutane is removed by line 32 and recycled through line 12 to primary reactor 14.

An overhead fraction is removed from depropanizer 27, which comprises propane and lighter materials, and is removed by line 33.

The catalyst phase recovered from the effluent from the primary reactor is passed by way of line 25 to secondary alkylation reactor 34. Isobutane recovered from the effluent from the secondary reactor 34 in line 35 is mixed with the propane and light materials in line 33, and the mixture passed by way of line 36 to secondary reactor 34 to contact the alkylation catalyst and from additional alkylate.

Light materials are taken overhead from secondary reactor 34 by way of line 37, cooled and condensed and passed to tank 38. A portion of the condensed material is returned by way of line 39 to an upper portion of secondary reactor 34. The remainder of the condensate removed from tank 38 is passed by way of line 40 to light ends column 41, wherein the light materials are taken overhead by line 42 for further disposal as desired. A bottoms fraction comprising isobutane is removed from column 41 by way of line 43, and passed by way of line 35 for combination with the overhead from the depropanizer 27.

An alkylate product also containing catalyst and some unreacted materials is removed from the lower portion of secondary reactor 34 by way of line 44 and passed to aluminum chambers 45A and 45B. Aluminum chambers 45A and 45B contain aluminum granules and contacted by an alklate product residual catalyst and unreacted materials introduced by way of line 44, and hydrogen halide, specifically HCl, by way of line 46. Within chambers 45 new aluminum chloride catalyst is formed and the alklate product serves as a carrier and removes same by way of line 47, and passes same either to primary reactor 14 by way of line 15 or to secondary reactor 34 by way of line 48, or to both reactors, as desired.

The reaction conditions and residence time in reactor 34 are so chosen that substantially complete reaction of the olefin occurs. The reaction product taken from the reactor through line 44, therefore, contains virtually no unreacted olefin, but is substantially completely composed of alkylate, excess isobutane and catalyst. Because of the fact that virtually all of the ethylene is reacted in reactor 34, virtually no ethylene is recycled to the first reactor, which allows the desired high isoparaffin to ethylene ratio to be used therein.

In the practice of the invention, the primary reactor will normally be operated at a temperature between 100° F. and 150° F., and a pressure between 75 p.s.i.g. and 400 p.s.i.g. Residence time of the reactants in the first or primary reactor will normally be about 30 seconds to 1 minute, providing a conversion in the first reactor of at least about 80 percent of the reactants.

Ordinarily, light ends column 41 is operated under conditions such that substantially only C$_4$ and heavier hydrocarbons are removed as bottoms by way of line 43, and lighter materials overhead. Similarly, fractionator 27 is so operated that substantially only propane and lighter materials are removed overhead, with the heavier hydrocarbons being removed as either intermediate or bottoms fraction.

The secondary reactor 34 is operated at a temperature between 100° F. and 140° F., at a pressure between 75 p.s.i.g. and 400 p.s.i.g., and the entering stream has a residence time in this reactor of approximately 5 minutes. The amount of feed, residence time and the reaction conditions for the secondary reactor are so chosen that the effluent stream from the second reactor will contain less than 0.01 percent unreacted olefin.

paraffin, and aluminum halide catalyst, but being substantially completely free of olefin;

(f) removing from said aluminum chambers in step (e) said effluent reaction mixture and newly formed aluminum halide catalyst and passing a portion of same to said first alkylation reaction zone and the remainder to said second alkylation reaction zone, and (g) removing overhead from said second alkylation reaction zone a light fraction which is condensed

TABLE

| Stream component [1] | Ethylene feed (10) | Fresh isobutane (11) | Recycle isobutane (12) | Light recycle (21) | Alkylate (31) | DC$_3$ overhead (33) | Light ends column bottom (43) | Hydrocarbon feed (26) | Catalyst (25) | Catalyst (47) | Feed to light ends (40) | HCl (46) | Light ends column overhead (42) |
|---|---|---|---|---|---|---|---|---|---|---|---|---|---|
| Light gases | 2 | | | 29 | | 2 | | 2 | | | 2 | | 2 |
| Ethylene | 587 | | 1 | 40 | | 7 | | 8 | 1 | | | | Trace |
| Ethane | 2 | | 1 | 8 | | 2 | | 2 | | | 2 | | 2 |
| Propane | | 14 | 66 | 56 | | 14 | 5 | 79 | 80 | 20 | 19 | | 14 |
| Isobutane | | 580 | 3,425 | 711 | | | 142 | 3,491 | 340 | 850 | 142 | | |
| n-Butane | | 14 | 699 | 91 | 12 | | 24 | 711 | 69 | 173 | 24 | | |
| Alkylate (C$_5$+) | | | 310 | 5 | 557 | | 7 | 866 | 84 | 210 | 7 | | |
| Total | 591 | 608 | 4,502 | 940 | 569 | 25 | 178 | 5,159 | 502 | 1,253 | 196 | | 18 |
| Catalyst #/hr | | | | | | | | | [2] 705 | [2] 809 | | | |
| HCl #/hr | (not determined in various streams) | | | | | | | | | | | 2 | |

[1] Hydrocarbon quantities are: #-mols/hour.
[2] Catalyst complex plus hydrocarbon carrier.

| | Temp., °F. | Pressure, p.s.i.a. | Top temp., °F. | Bottom temp., °F. |
|---|---|---|---|---|
| Reactor (14) | 125 | 85 | | |
| Reactor (34) | 125 | 200 | | |
| Depropanizer (27) | | 285 | 137 | 406 |
| Light ends column (41) | | 270 | 130 | 395 |
| Flash tank (18) | 105 | 78 | | |
| Accum. (38) | 105 | 195 | | |

I claim:

1. An alkylation process which comprises:
   (a) contacting in a first alkylation reaction zone an isoparaffin with an olefin under alkylation conditions in the presence of an aluminum halide alkylation catalyst to form alkylate product;
   (b) separating the effluent reaction mixture obtained in step (a) comprising produced alkylate product, unreacted charged feed materials, and aluminum halide catalyst into a hydrocarbon phase comprising produced alkylate product and unreacted charged feed materials and an aluminum halide catalyst phase;
   (c) fractionating said hydrocarbon phase obtained in step (b) to obtain an alkylate product bottoms, an intermediate isoparaffin stream and an overhead light fraction comprising unreacted olefin;
   (d) contacting said aluminum halide catalyst phase separated in step (b) and said light fraction obtained in step (c) with isoparaffin in a second alkylation reaction zone under conditions of temperature, pressure and residence time to obtain substantially complete reaction of the olefin;
   (e) passing the effluent reaction mixture obtained from said second alkylation reaction zone and hydrogen halide through aluminum chambers to form new aluminum halide catalyst, said effluent reaction mixture comprising produced alkylate, unreacted isoand a portion of the condensed overhead is returned to said second alkylation reaction zone and the remainder is fractionated into a light hydrocarbon fraction comprising inert materials which are removed from the process, thereby avoiding the buildup of inert materials, and an isoparaffin fraction, which is recycled to said second alkylation reaction zone.

2. A process according to claim 1 wherein the reaction product removed from the first reaction zone is subjected to cyclone separation to recover said hydrocarbon phase and said catalyst phase.

3. A process according to claim 1 wherein the isoparaffin fraction recovered in step (c) is recycled to said first reaction zone.

4. A process according to claim 1 wherein said hydrogen halide is HCl and said catalyst formed is aluminum chloride.

5. A process according to claim 1 wherein said olefin is ethylene and said isoparaffin is isobutane.

6. A process according to claim 1 wherein said olefin is ethylene, said isoparaffin is isobutane, said hydrogen halide is HCl, said catalyst formed in step (e) is aluminum chloride, and the light hydrocarbon fraction removed from the process in step (g) is comprised of propane and lighter materials.

References Cited

UNITED STATES PATENTS 2,395,022  2/1946  Sutton et al. _____ 260—683.57
2,405,490  8/1946  Chenicek et al. _____ 260—683.57
2,410,498  11/1946  Hepp _____ 260—683.57

DELBERT E. GANTZ, Primary Examiner

G. J. CRASANAKIS, Assistant Examiner

U.S. Cl. X.R.

260—683.45